United States Patent Office 2,849,463
Patented Aug. 26, 1958

2,849,463
PROCESS OF MAKING 3,20-DISEMICARBAZONE OF CORTISONE ACETATE

Robert Joly, Montmorency, Gerard Nomine, Noisy-le-Sec, and Jean Jolly, Fontenay-sous-Bois, France, assignors to Les Laboratoires Francais de Chimiotherapie, Paris, France, a French body corporate No Drawing. Original application April 13, 1955, Serial No. 501,174. Divided and this application April 11, 1957, Serial No. 652,097

Claims priority, application France July 29, 1954

1 Claim. (Cl. 260—397.45)

The present invention relates to a process of making the 3,20-disemicarbazone of cortisone acetate.

The present application is a division of our co-pending application Serial No. 501,174, filed April 13, 1955, and entitled: "The 3,20-disemicarbazone of Cortisone Acetate and a Process of Making Same."

It is known to produce the acetate of hydrocortisone (11β,17α,21-trihydroxy-Δ4-pregnene-3,20-dione) by reducing the 3,20-disemicarbazone of free cortisone by means of lithium borohydride to the corresponding compound having a hydroxyl group in 11β-position. Acetylating said compound in 21-position and subjecting the resulting acetoxy compound to an exchange reaction with pyruvic acid yields the 21-acetate of hydrocortisone.

Free cortisone serving as starting material in said known synthesis is usually prepared from cortisone acetate. Said compound, generally, is obtained by splitting off hydrogen bromide from the 21-acetate of 17α,21-hydroxy-4-bromo pregnane-3,11,20-trione of the following Formula II whereby the monosemicarbazone of Formula III is employed as intermediate product:

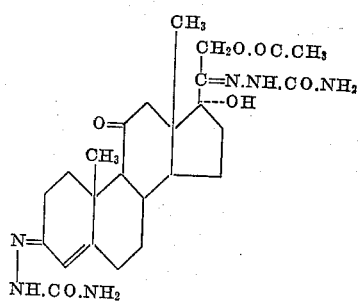

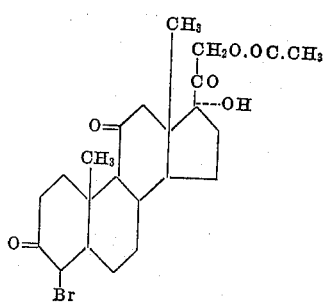

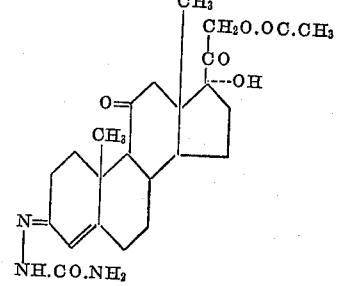

Direct formation of the 3,20-disemicarbazone of Formula I from the bromo ketone of Formula II would be of considerable importance, because it would permit elimination of three steps in the synthesis of hydrocortisone.

The bromo ketone of Formula II and cortisone acetate were believed to yield exclusively the monosemicarbazone of Formula III, even under very favorable reaction conditions and in the presence of an excess of the reagent. This result is attributed to steric hindrance at the 20-carbonyl group in virtue of a neighboring ester function at position 21. Preparation of said monosemicarbazone was effected in acetic acid solution at a temperature of 70–75° C.

It is one object of the present invention to provide a simple and effective process of directly preparing the 3,20-disemicarbazone of cortisone acetate corresponding to Formula I by starting with cortisone acetate.

Other objects of the present invention and advantageous features thereof will become apparent as the description proceeds.

In principle, the process according to the present invention comprises the reaction of five mols of semicarbazide hydrochloride in acetic acid solution with cortisone acetate. The reaction is carried out in the presence of disodium phosphate and care is taken that the reaction temperature does not substantially exceed 50° C. In view of the teachings of the prior art it is completely unexpected and quite surprising that the disemicarbazone is formed thereby.

The following example serves to illustrate the present invention, without, however, limiting the same thereto.

EXAMPLE

*Preparation of the 3,20-disemicarbazone of cortisone acetate of Formula I by using cortisone acetate as starting material*

150 cc. of acetic acid containing 1.5% of water are heated to a temperature of 40–45° C. while passing a current of nitrogen gas therethrough. 16 g. of cortisone acetate, 20 g. of semicarbazide hydrochloride, and 45 g. of sodium phosphate are introduced into the heated acetic acid and heating of the mixture in a nitrogen atmosphere is continued for 4 hours. The reaction mixture is then poured into 1500 cc. of lukewarm water. The resulting aqueous mixture is cooled in a refrigerator, the precipitated crystals are filtered off, washed, dried, and recrystallized from ethoxy ethanol. Thereby 16.4 g. of the disemicarbazone are obtained. The yield amounts to 80% of the theoretical yield. The pure disemicarbazone of cortisone acetate decomposes, on heating, above 240° C.; rotatory power $[\alpha]_D = +198° \pm 3°$ (concentration: 1% in pyridine; $\lambda_{max} = 269$ m$\mu$; $\epsilon_{max} = 32,400$ (ethanol).

We claim:

In a process of preparing the 3,20-disemicarbazone of cortisone acetate, the steps comprising heating cortisone acetate at a temperature not substantially exceeding 50° C. in acetic acid containing about 1.5% of water in a nitrogen atmosphere with about 5 mols of semicarbazide hydrochloride and with the addition of disodium phosphate as buffer compound and separating the resulting disemicarbazone from the reaction mixture.

References Cited in the file of this patent

UNITED STATES PATENTS 2,590,993    McGuckin et al. -------- Apr. 1, 1952

OTHER REFERENCES

"Handbook of Chemistry," Lange, 8th edition, 1952, page 939.